(No Model.) 2 Sheets—Sheet 1.

L. A. ASPINWALL.
CHECK ROW CORN PLANTER.

No. 388,104. Patented Aug. 21, 1888.

Witnesses
Harold Serrell,
Chas. H. Smith

Inventor,
per Lewis Augustus Aspinwall,
Lemuel W. Serrell
atty

N. PETERS, Photo-Lithographer, Washington, D. C.

(No Model.) 2 Sheets—Sheet 2.

L. A. ASPINWALL.
CHECK ROW CORN PLANTER.

No. 388,104. Patented Aug. 21, 1888.

Witnesses,
Harold Serrell,
Chas. H. Smith

Inventor,
Lewis Augustus Aspinwall
per
Lemuel W. Serrell,
atty

UNITED STATES PATENT OFFICE.

LEWIS AUGS. ASPINWALL, OF THREE RIVERS, MICHIGAN, ASSIGNOR TO CHARLES W. BREGA, OF CHICAGO, ILLINOIS.

CHECK-ROW CORN-PLANTER.

SPECIFICATION forming part of Letters Patent No. 388,104, dated August 21, 1888.

Application filed April 23, 1888. Serial No. 271,562. (No model.)

*To all whom it may concern:*

Be it known that I, LEWIS AUGUSTUS ASPINWALL, of Three Rivers, in the county of St. Joseph and State of Michigan, have invented an Improvement in Check-Row Corn-Planters, of which the following is a specification.

In check-rowers in which the wheels are attached to the axle and moved with the markers difficulty is experienced in correcting the markers, because in so doing the wheels have to be slipped upon the surface of the ground.

In my present improvements the markers are connected with the axle and the wheels are loose upon the shaft, there being a ratchet-wheel and pawls for connecting the axle with the driving-wheel, and I combine with these parts the correcting device, which acts to set the markers either forward or back to bring the same correctly into line with the other marks in the field. By my improvement I avoid the necessity of first marking the ground or of using a wire or rope.

Figure 1:
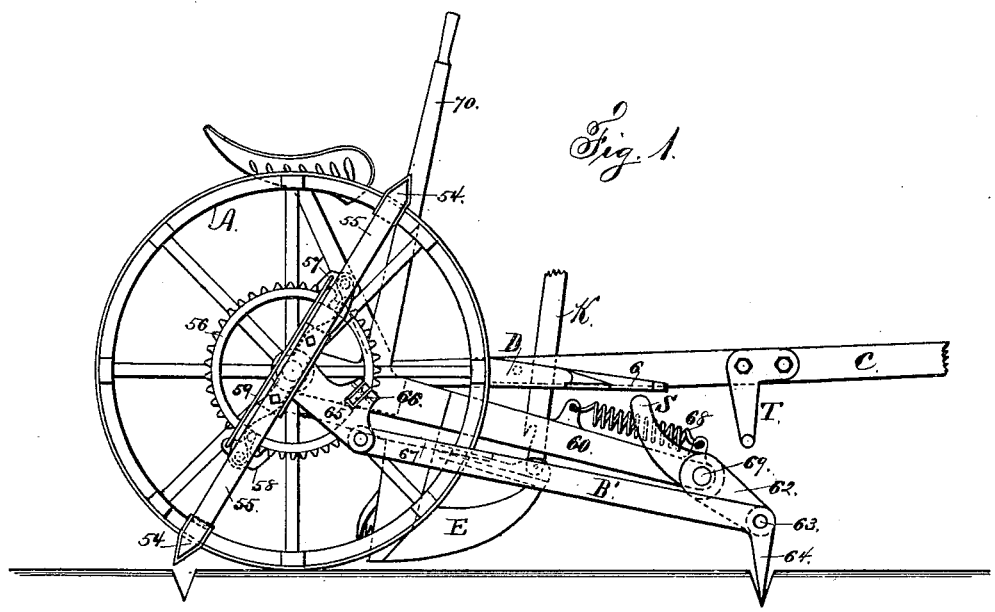
Figure 3:
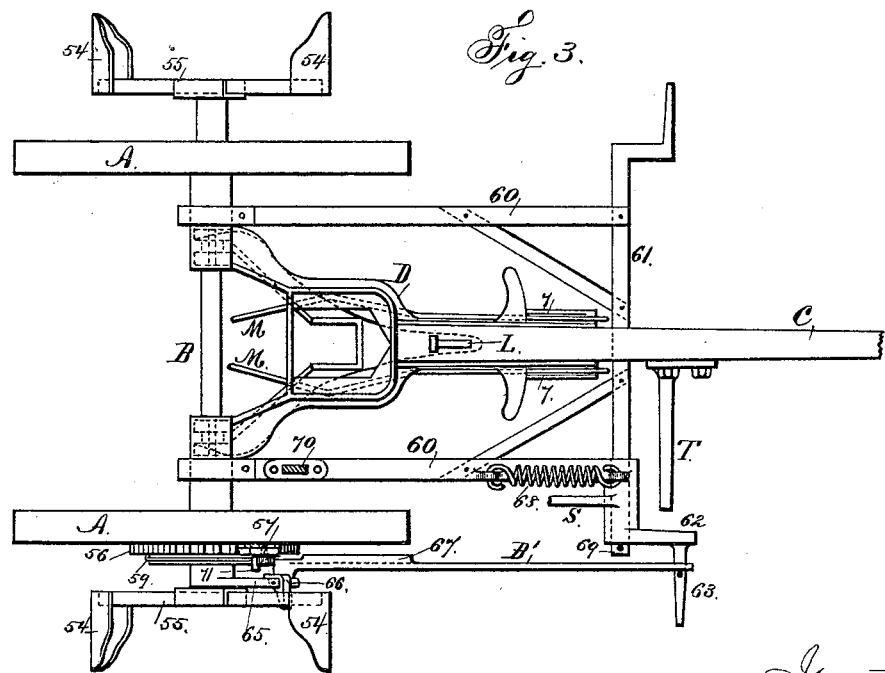
Figure 4:
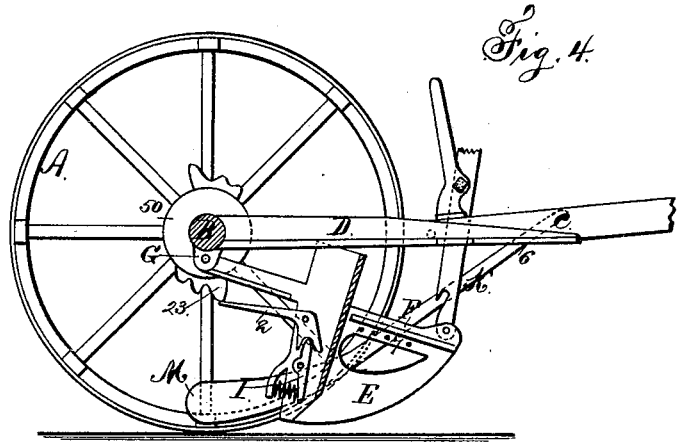
Figure 2:
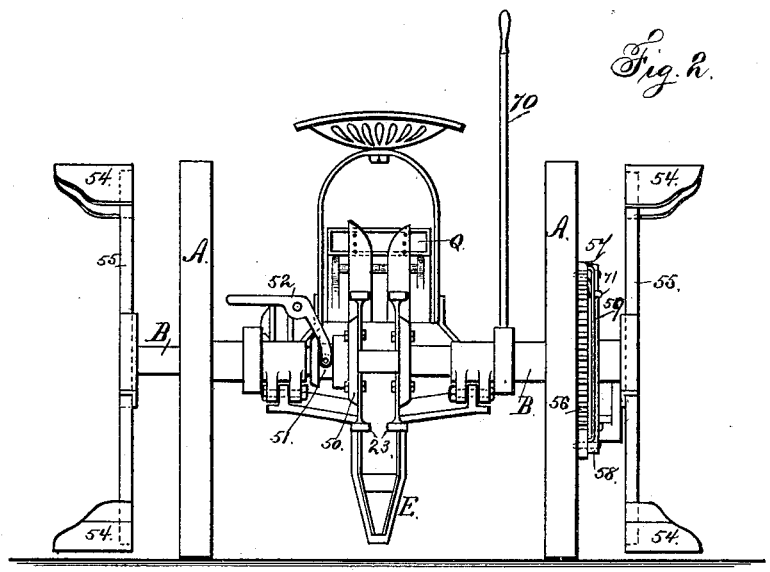
Figure 5:
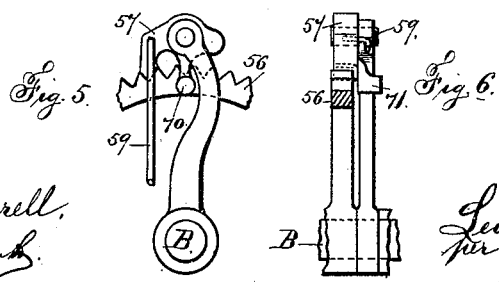
Figure 6:
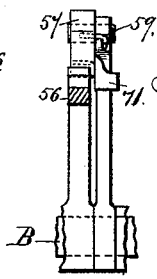

In the drawings, Figure 1 is an elevation at the right side of the machine. Fig. 2 is a rear view. Fig. 3 is a plan, some of the parts being omitted for greater clearness. Fig. 4 is a section, illustrating the position of the dropping apparatus; and Figs. 5 and 6 are front and side views of connecting-pawls, &c.

The wheels A, axle B, tongue or pole C, frame D, plow or furrow-opener E, and radius-bar F, for connecting the front end of the plow to the hinge G upon the frame D are similar to the devices represented in my application, Serial No. 264,609, filed February 20, 1888, and the link K and lever L, for raising the plow, and the coverers M, connected at 7 to the bar F and passing through mortises at 6 in the frame D, are also similar to those shown in said application, and the corn is contained in the hopper Q, from which it is dropped by the action of slides in any suitable manner, and the same passes down into the plow E, and it is there held by the valve I until such valve is moved by the action of the lever 2 and cam 23, and this cam 23 is fastened upon the axle B and placed in such a position in relation to the markers that the corn is dropped in line with the marks made by the markers.

The cams 23 are preferably fastened upon the disk 50, that surrounds the axle B, and the slide-clutch 51 is acted upon by a lever, 52, to connect the cams with the axle or to disconnect the same when the planter is going to the field or whenever the supply of corn is to be stopped. This clutch 52 will only connect with the cams 23 and disk 50 whenever such cams are in the proper position in relation to the markers—that is to say, such clutch should have but two pins or connecting-lugs at opposite sides of the axle and in line with the markers.

The markers 54 are upon the arms 55, which are fastened permanently at the ends of the axle B by a suitable shoe-piece, and there is a ratchet-wheel, 56, fastened permanently to the spokes of one wheel A, preferably the right-hand wheel, and there are pawls 57 58 pivoted upon a cross-bar in line with the markers, so as to move with such markers, and these pawls 57 58 are connected by a rod, 59, pivoted at its ends to the respective parts of the pawls, as shown, so that such pawls move together in engaging the teeth of the ratchet-wheel 56 or in being disengaged therefrom. When the machine is in action, the pawls 57 and 58 cause the axle B and the markers to turn with and by the right-hand wheel A, the left-hand wheel being loose upon the axle, and as the planting progresses these markers mark the earth at each side of the machine, and in planting the second row of corn the attendant is guided by the marks made in the earth by the markers on the left-hand side of the machine, which marks have been made by the machine in planting the previous row of corn. During this operation, should the attendant discover that the markers on the right hand of his machine do not come into the marks that have before been made by the machine in planting the previous row, it is necessary to set those markers either farther forward or farther backward in order that the planting may be accurate, and in doing this the axle is turned slightly one way or the other by the devices hereinafter described, and this not only sets the markers to the proper position, but the cam 23 is also adjusted so that the valve will be moved and the corn dropped at the proper time to correspond with the marks made by the markers. It will be apparent that the plow E being connected to the axle by the bar F, the penetrating point thereof describes the arc of a circle corresponding, or nearly so, to that of the wheels, and the plow can be raised or lowered for planting a greater or less depth without interfering with the accuracy of the operation, the planting always being in line with the markers, that revolve with the axle.

The correcting mechanism consists of a frame, 60, having at its back ends straps that pass around the cylindrical portions of the axle B near the hubs of the wheels, and the forward ends of these frame-pieces 60 are firmly united together by a cross-piece, 61, having at one end a gudgeon, 69, for the crank 62, and this crank has a crank-pin, 63, that passes into the connecting-rod B', upon which connecting-rod is a downward-projecting prong, 64, and the back end of this connecting-rod B' is pivoted to a crank, 65, that is loose upon the axle B, and this crank 65 carries the pawl 66, and upon one side of the connecting-rod B' is a flange, 67.

Upon the eye of the crank 62 is a cam-arm, S, and upon the tongue or pole C is a projecting finger or bracket, T. The spring 68 serves to turn the crank 62 into the position shown in Fig. 1, and there is a lever, 70, extending up from the frame 60, by which the attendant can raise or lower the frame 60 and the crank and connecting-rod.

In the ordinary position of use the frame 60, crank 62, and connecting-rod B' are elevated; but if the markers do not correspond exactly with the marks previously made the correcting mechanism is brought into action by the attendant moving the lever 70 and depressing the connecting-rod, so that the claw 64 passes down into the mark that has been previously made in the earth. Thereby the said connecting-rod and prong are arrested, and as the machine is drawn on the crank 65 swings upon its pivotal connection to the rod B' until the pawl 66 comes into contact with one arm, 55, of the markers 54, and in so doing partially revolves such markers and the axle, causing the pawls 57 58 to take up one or more teeth in the wheel 56. This movement results from the fact that the crank 65 is shorter than the radius of the wheels A, and, the prong and connecting-rod remaining stationary as the planter is moved along, the pawl 66 overtakes the arm and markers, and the parts are so proportioned that the markers will only be moved the proper distance to make up for any inaccuracy in their position, because as the planter is drawn along the crank 62 swings upon the crank-pin 63 and the frame 60 is raised, and the cam-arm S comes over the bracket T, and the prong 64 and connecting-rod are lifted out of the earth at the moment the markers have been properly set; but should the pawl 66 not come in contact with the arm 55 of the markers the flange 67 will come in contact with the projecting arm 71 of one of the pawls, 57 or 58, and lift the same, and by the rod 59 lift the other pawls, also, away from the teeth of the wheel 56, allowing that wheel 56 to turn with the wheel A, while the marker is held upon the flange 67 until they pass forward and off the front end of 67 and the pawls take into the next or following teeth of the wheel 56 before the prong 64 is raised out of the ground, and when this takes place the spring 68 restores the parts to their normal position, so that the markers are not influenced by the pawl 66 until the prong is again thrust into the ground to correct any inaccuracy of the markers.

I claim as my invention—

1. The combination, in a check-rower planter, of the wheels loose on the axle with the markers and their arms permanently connected to the axle, a ratchet-wheel upon one of the driving-wheels, and pawls for connecting the axle with the driving-wheel, and with mechanism, substantially as specified, connected to said parts for correcting the position of the markers, substantially as set forth.

2. The driving-wheels and axle, in combination with the markers and their arms permanently connected to the axle, a ratchet-wheel and pawls for connecting the axle to one of the driving-wheels, a prong, connecting-rod, crank, and pawl for turning the markers by the movement of the machine when the prong is thrust into the ground, and thereby rectifying the position of the markers, substantially as set forth.

3. The combination, with the axle and markers to which they are connected, of a crank upon the axle, a connecting-rod and prong, a frame and lever for raising or lowering the prong, and a crank forming a connection between the prong and the frame, and a stationary finger or bracket acting upon the arm or finger of the crank to raise the prong out of the ground at the proper moment, substantially as set forth.

4. The combination, with the markers and the axle to which they are connected, of the cam upon the axle, the hopper and dropping mechanism connected therewith, and the plow, and the valve within the plow for dropping the corn, substantially as set forth.

5. The combination, with the driving-wheels loose upon the axle and the markers permanently connected to the axle, and the pawls and ratchet-wheel for connecting the driving-wheel to the axle, of the crank 65 upon the axle and a pawl upon the crank, a connecting-rod and prong, and the flange 67, for acting upon the pawls, the frame 60 and lever for raising or lowering the same, a crank forming the connection between the prong and the frame, a bracket for raising the crank and prong, and a spring, 68, for returning the parts to their normal position, substantially as set forth.

Signed by me this 13th day of March, 1888.

L. AUGS. ASPINWALL.

Witnesses:
WALTER ALEXANDER,
D. W. THAYER.